Figure 1:
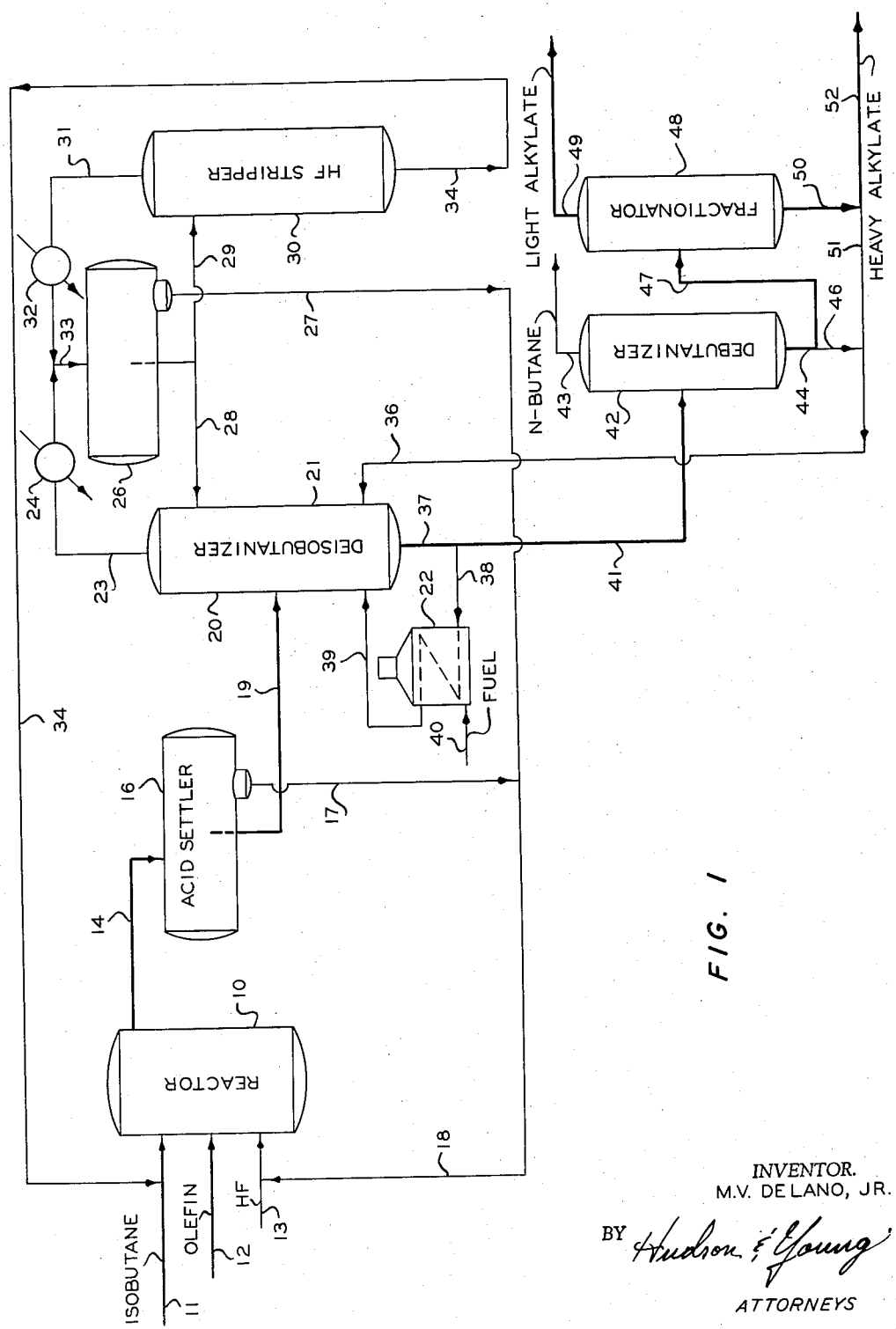

2,972,648
Patented Feb. 21, 1961

2,972,648
HYDROGEN FLUORIDE ALKYLATION PROCESS AND APPARATUS

Merritt V. De Lano, Jr., Bartlesville, Okla., assignor to Phillips Petroleum Company, a corporation of Delaware Filed Sept. 8, 1958, Ser. No. 759,535

10 Claims. (Cl. 260—683.42)

This invention relates to hydrogen fluoride alkylation. In another aspect it relates to an improved method for defluorinating the reaction effluent of a hydrogen fluoride-catalyzed isobutane-olefin alkylation process. In one of its more specific aspects this invention relates to thermal defluorination of deisobutanized alkylate of isobutane and olefin and to apparatus for carrying out said defluorination.

An important industrial process involving the use of hydrogen fluoride is the alkylation of low boiling paraffinic hydrocarbons, particularly isobutane, with alkylating agents, particularly olefins such as propylene and butylenes, to for normally liquid, high octane-number paraffins suitable for use in aviation fuels. In such an alkylation process the reactants are intimately contacted in the liquid phase with liquid concentrated hydrofluoric acid, and the reaction effluent is passed through a series of recovery steps including phase separation and fractional distillation to separate the hydrogen fluoride from the hydrocarbon constituents, and the low boiling reactants and impurities from the alkylate product.

While hydrogen fluoride can be readily separated from the alkylate by the above-mentioned processes of phase separation and fractionation, the organic fluorides which form during the reaction pose a more difficult separation problem. In certain instances these organic fluorides can be decomposed to hydrocarbon and hydrofluoric acid by thermally treating the deisobutanized alkylate at temperatures sufficiently high to produce said decomposition. The presence of unusually large amounts of normal butane in the feed to the alkylator complicates this approach, however, because the comparatively low boiling normal butane remains in the bottoms product from the deisobutanizer and prevents adequate temperatures from being reached during the thermal treatment. Complete varporization during during thermal treatment is sometimes necessary when the normal butane content is high and this in turn reduces the possible circulation rate with equipment which has not been sized specifically to cope with high concentrations of normal butane in the feed to the alkylation process.

According to my invention a method is provided by which increased temperatures and circulation rates can be obtained in thermal defluorination of deisobutanized alkylate, and apparatus is likewise provided which insures improved circulation of the deisobutanized alkylate through the thermal defluorination zone. These results are obtained by circulating a portion of the alkylate from which butane has been removed through the thermal defluorination step in admixture with the deisobutanized product, thereby lowering the vapor pressure of the material passing through the defluorination step and thus increasing both the available temperature and the possible circulation rate. The apparatus of my invention enables the above process to be practiced with improved circulation of deisobutanized alkylate having high concentration or organic fluorides through the defluorination furnace. This is done in the combination of a deisobutanizing column, a defluorinating reboiler and a debutanizing column by providing a vertical baffle in the lower portion of the deisobutanizing column below the bottom bubble plate, said baffle dividing this bottom section into first and second sections which communicate over the top of said baffle. The downcomer from the bottom bubble plate extends into said first section which is connected by a first conduit through the defluorination reboiler to said second section, thereby permitting circulation of alkylate from the first section, through the reboiler, and into said second section. Material can flow over the top of the baffle plate into the first section again. A second conduit connects said second section with the debutanizing column so that the material passed to the debutanizing column is restricted to that which has been through the defluorination reboiler. A third conduit connects the lower portion of the debutanizing column with said first conduit so that the debutanized alkylate can be returned for mixing with the deisobutanized bottoms in accordance with the above-described process.

Figure 2:
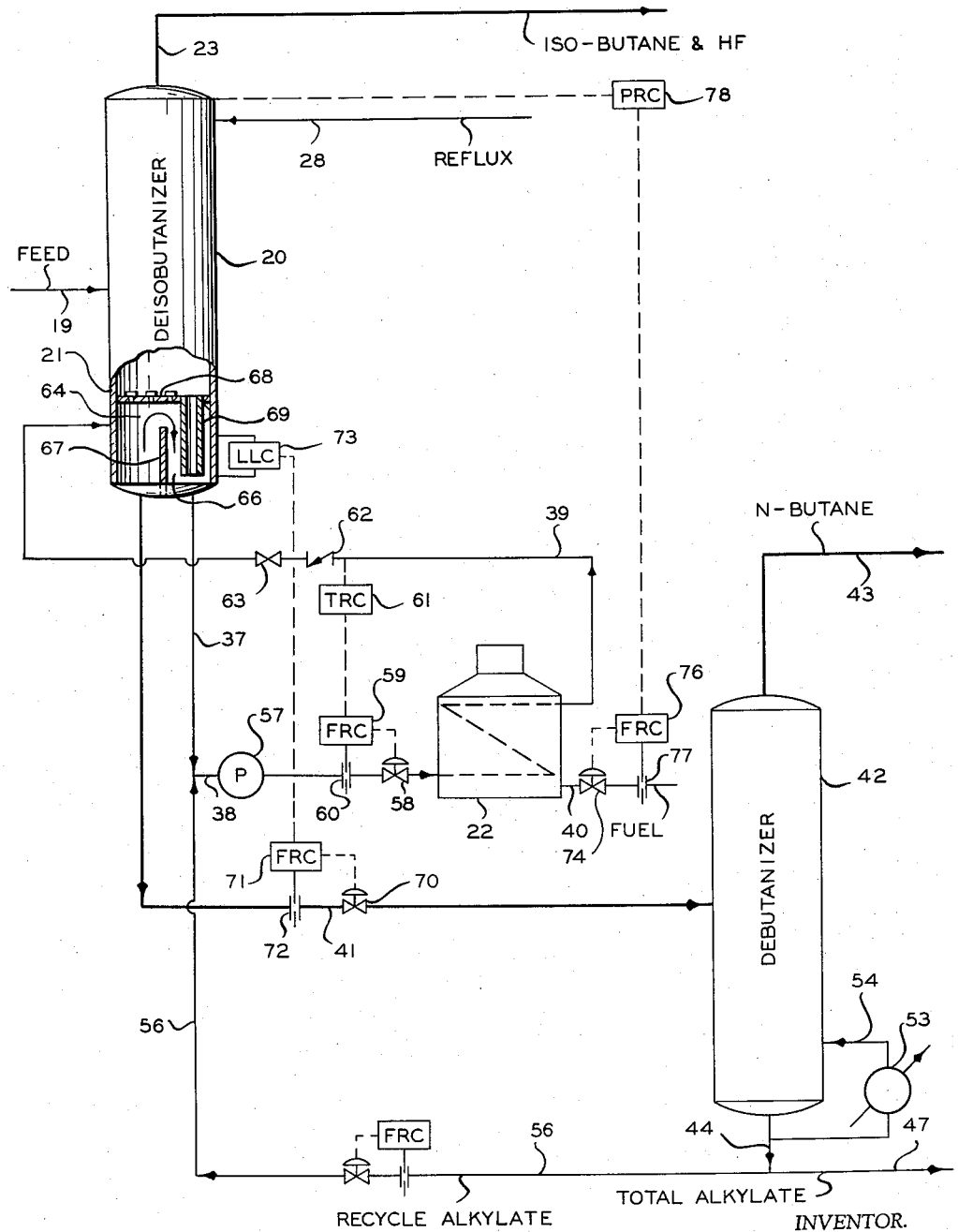

It is an object of my invention to provide an improved hydrogen fluoride alkylation process. Another object of my invention is to improve the thermal defluorination of the deisobutanized alkylate from a hydrogen fluoride alkylation process. Another object is to enable satisfactory removal of organic fluorides from a hydrogen fluoride-catalyzed alkylation product in which an unusually high amount of normal butane is present in the feed to the reactor. Still another object of my invention is to provide apparatus by which increased and more efficient circulation can be obtained through the thermal defluorination furnace. Other objects, advantages and features of my invention will be apparent to those skilled in the art from the following discussion and the drawings in which:

Figure 1 is a schematic flow diagram showing an alkylation process with alkylate and hydrogen fluoride recovery; and Figure 2 is a simplified flow diagram of the thermal deflourination process and apparatus of my invention.

The material passing through the reboiler of a deisobutanizer column of a hydrofluoric acid alkylation unit is ordinarily heated to about 400 to 450° F. in order to thermally break down the organic fluorides formed in the alkylation process. If there is a great deal of normal butane present in the feed to the alkylation process all of the deisobutanizer bottoms passing through the reboiler is vaporized at about 400° F. even with high pressure on the reboiler. Total vaporization prevents maintaining the circulation rates which are required to adequately reduce the concentration of organic fluorides in the alkylate. The amount of normal butane may be so high that the temeprature of 400° F. cannot be reached without total vaporization. A further disadvantage of total vaporization may exist when exceptionally heavy products have been formed in the alkylation process thereby leading to formation of tars and coke on the furnace tubes. By recycling debutanized alkylate back to the deisobutanizer kettle in order to reduce the vapor pressure of the material passing through the reboiler, total vaporization can be avoided and the desired temperature for decomposition of organic fluorides can be obtained. This permits improved circulation rates so that the ideal conditions for fluoride decomposition are obtainable. An advantage of my process is that it can readily be adapted to existing systems without major structural changes. The debutanized alkylate recycle remains in the bottoms product when it is returned to the debutanizer so this recycle does not necessarily require an increase in the size of the debutanizer column. When subsequent fractionation of the debutanized alkylate is carried out to separate light and heavy alkylate fractions, a portion of this heavy alkylate can be returned to the deisobutanizer kettle. By using the heavy alkylate the required quantity of recycle material is reduced.

A more complete understanding of my invention is possible by referring to the accompanying drawing in which Figure 1 is a schematic flow diagram of an alkylation process which has been simplified to show my improvement in thermal defluorination. Isobutane, olefin and hydrofluoric acid are fed to reactor 10 through conduits 11, 12 and 13, respectively. The feed materials are commingled in reactor 10 under alkylation conditions to obtain an effluent containing the desired alkylate products. The conditions of temperature, pressure and reaction time as well as the ratios of isobutane to olefin and of hydrocarbon to acid are well known in the art.

Although these conditions do not form a part of the present invention, for exemplary purposes suitable conditions are set forth as follows: temperature, 90 to 115° F.; pressure, 80 to 175 pounds per square inch guage; average reaction time, in the order of about 5 to 15 minutes. Rapid agitation is maintained to insure intimate contact between the acid and hydrocarbon phases. The ratio of isobutane to alkylating agent or olefin can be about 6:1 parts by weight and the acid to hydrocarbon ratio can be about 2:1 parts by weight.

The resulting effluent mixture from alkylator 10 is passed by way of conduit 14 to acid settler 16 in which the mixture separates into an acid phase and a hydrocarbon phase. The acid phase is recycled by way of conduits 17, 18 and 13 to reactor 10. While the flow diagram shows a direct course for this recycle acid it is understood that intermediate purification steps can be employed if desired.

The hydrocarbon phase is passed from settler 16 by conduit 19 to deisobutanizing column 20. At this point the feed to the deisobutanizing column comprises the alkylate formed in reactor 10 plus isobutane, normal butane, hydrogen fluoride and a small amount, generally from 0.03 to about 0.06 weight percent, organic fluorides. Deisobutanizing column 20 is a conventional bubble plate column having a kettle section 21 and an external reboiler 22. The overhead product from deisobutanizer 20 comprises isobutane, hydrogen fluoride and any lighter boiling material, such as propane, which may be present. The overhead stream passes through line 23, condenser 24 and line 33 to reflux accumulator 26. Additional opportunity is provided in reflux accumulator 26 for the acid to settle from the hydrocarbon phase. This acid is recycled through line 27 to line 18 and thence back to reactor 10 through line 13. In this case, as previously mentioned, the hydrofluoric acid can pass through intermediate purification steps before returning to reactor 10. A portion of the hydrocarbon phase from accumulator 26 is refluxed to column 20 through line 28.

Production amounts of the hydrocarbon phase from accumulator 26 pass through line 29 to hydrogen fluoride stripper 30. Substantially all of the remaining hydrogen fluoride is removed from the hydrocarbon in stripper 30. The overhead product comprising hydrogen fluoride and hydrocarbon is passed through line 31, condenser 32 and line 33 to accumulator 26. Hydrocarbon which is predominantly isobutane plus lighter boiling material if present, such as propane, is removed from the bottom of column 30 through line 34 and can be recycled to reactor 10 with the fresh feed in line 11. Where impure feeds are employed, as is usually the case, suitable separation steps are provided either before or following the reactor, either before or after the deisobutanizer, to remove inert gases, such as propane, so that these materials will not build up in the system. It is understood that if propane is present in the recycle stream in line 34 and suitable separation stages are not provided in feed line 11, then such separation must be provided for in the recycle stream. Such features are known in the art and do not constitute a part of my invention per se.

Deisobutanized kettle product from column 20 comprises alkylate and normal butane plus organic fluorides which were not removed in the column. This kettle product is mixed with a recycled alkylate which enters the column through line 36. This alkylate has had the butane removed and therefore lowers the vapor pressure of the ketttle product from column 20. The mixture thus formed passes through line 37 and line 38 through the external reboiler 22 and is returned to the column through line 39. Reboiler 22 is fired by fuel fed through line 40. By reason of the lower vapor pressure produced in the mixture on introducing the higher boiler alkylate to the bottom of column 20, a higher temperature can be obtained in the reboiler and the organic fluorides can be readily decomposed into hydrogen fluoride and hydrocarbon. The hydrogen fluoride is in turn volatilized on reentry into column 20 and passes upwardly through the column leaving as part of the overhead product in line 23, as discussed above. The recirculation rate through reboiler 22 is sufficiently high that the concentration of organic fluorides in the recirculated mixture is held at a satisfactory value, generally about 0.003 weight percent or less. Production amounts of the deisobutanized alkylate in admixture with recycled debutanized alkylate are withdrawn through line 41, shown in this embodiment as connected to line 37, and passed to debutanizing column 42. Line 41 can also be connected directly to the kettle section 21 of column 20, as shown in the embodiment of Figure 2.

Product in line 41 thus enters column 42 and is fractionated to remove normal butane as an overhead product through line 43. Suitable steps for recovery of the normal butane are normally present but are not shown in Figure 1. The kettle product from column 42 comprises alkylate of pentanes and heavier, and is essentially free of normal butane. The kettle product is removed from column 42 through line 44. A portion of this product is passed through line 46 to line 36 wherein it is recycled to column 20 as above described. The remainder of the kettle product passes through line 47 to fractionator 48 where the alkylate product is separated into a light and heavy alkylate, light alkylate leaving overhead through line 49 and heavy alkylate passing from the kettle section of the column to line 50. Fractionator 48 is not necessarily employed in all instances but where such a separation is made it is of advantage to recycle a portion of the heavy alkylate through line 51 to line 36 and thence back to column 20. Production amounts of heavy alkylate are withdrawn through line 52. The recycle of alkylate through lines 46 and 51 can be employed alternatively or in combination to achieve the desired control over the vapor pressure of the mixture in the kettle section 21.

The amount of alkylate which is recycled in a particular instance will depend to a large extent upon the concentration of normal butane in the feed to column 20. The optimum recycle rate can readily be set by one skilled in the art by observing the temperatures obtainable in reboiler 22 without complete vaporization. It is my object, of course, to obtain defluorination temperatures in reboiler 22. These temperatures are normally at least about 400° F. and seldom extend beyond 500° F. To more specifically describe the improved defluorination of my invention and the apparatus used in connection therewith reference is made now to Figure 2. Reference numerals employed in Figures 1 and 2 are the same where the apparatus or the function of the apparatus is the same in both figures.

In Figure 2, hydrocarbon comprising alkylate, normal butane, isobutane, hydrogen fluoride and organic fluorides is fed through line 19 into deisobutanizer 20. Overhead product is removed through line 23 and condensed reflux is returned through line 28 as previously described. Bottoms from the kettle section 21 of column 20 are removed through line 41 and passed to debutanizer column 42 wherein a separation is made between normal butane and alkylate. Alkylate leaves column 42 through line 44. Heat is supplied to debutanizer column 42 by external reboiler 53 through which alkylate is passed via line 54. A portion of the alkylate is withdrawn through line 56 and recycled through lines 38 and 39 to column 20.

As shown in Figure 2, the recycled alkylate is added to the circulating stream of bottoms product from kettle 21 which is passing through lines 37 and 38 to reboiler 22. Bottoms from kettle 21 are removed through line 37 and pass through line 38 to reboiler 22 and then through line 39 back to column 20. This circulating stream is moved by pump 57 in line 38 and the flow is controlled by motor valve 58. Flow recorder controller 59 is operatively connected to motor valve 58 and an orifice 60 in line 38. The circulation rate through reboiler 22 is, therefore, substantially constant and can be reset as required to arrive at the desired temperature in the heated stream in line 39. Temperature recorder controller 61 is provided to sense the temperature of the stream in line 39 and reset flow recorder controller 59 accordingly. The circulating heated alkylate thus passes through check valve 62 and valve 63 in line 39 and returns to kettle section 21.

Kettle section 21 is divided into two portions, 64 and 66, by baffle 67. Baffle 67 is a vertical partition which extends across the full width of kettle 21 and is positioned below the bottom bubble plate 68 so that sections 64 and 66 communicate over the top of baffle 67. The downcomer 69 from bubble plate 68 is positioned to extend into section 66. In the reboiler circulating loop, line 37 is connected to section 66 and line 39 is connected to section 64 so that in circulating the alkylate through the reboiler for defluorination thereof, the material passes from section 66 through reboiler 22 and back to section 64. Under normal conditions a portion of the alkylate will flow over the top of baffle 67 and return to section 66 for recirculation through the reboiler. Conduit 41 is positioned to withdraw material from section 64. This material is alkylate that has completed at least one pass through reboiler 22. Flow through conduit 41 is controlled by motor valve 70. Flow controller 71 is operatively connected to motor valve 70 and orifice 72 in line 41. A substantially constant flow is maintained through line 41 but this flow rate can be reset in response to a signal from liquid level controller 73 which senses the level of liquid in section 66 of kettle 21. In this way sufficient mixture is maintained flowing over the top of baffle 67 from section 64 to section 66. The liquid level in section 66 does not become high enough to permit mixture to flow from section 66 to section 64. Bottoms product from deisobutanizer 20 which flows through downcomer 69 is routed through reboiler 22 for defluorination thereof and the possibility of this short-circuiting to line 41 is eliminated. While the above-described structure of kettle 21 is not essential for enjoyment of the major benefits of my invention, it is an alternate embodiment.

As an additional control feature, the pressure in column 20 is maintained substantially constant by controlling the flow rate of fuel gas to reboiler 22. Fuel which is fed through line 40 is controlled by motor valve 74. Flow recorder controller 76 is operatively connected to motor valve 74 and orifice 77 in line 40. This flow is substantially constant and is reset in response to a signal from pressure recorder controller 78 which senses the pressure in the top of column 20. A decrease in the pressure at the top of column 20 produces an increase in the amount of fuel fed to reboiler 22 and this in turn produces an increase in the circulation rate in order to maintain the temperature at the desired value. In the preferred operation of the above process, the temperature in line 39 is maintained at about 400 to 425° F. The circulation rate through the reboiler 22 will generally be about 6 to 12 times the net withdrawal rate of deisobutanized alkylate through line 41. By net withdrawal rate of deisobutanized alkylate I refer to the total flow through line 41 less the recycled alkylate from the debutanizer. Circulation rates are preferably at least as high as 10 times said net withdrawal rate for good defluorination. The process of my invention permits such circulation rates to be obtained with ease, even though the concentration of normal butane in the feed to the deisobutanizer is higher than specified in the original design conditions of the system. This is especially true when the reboilers are designed for only vapor-liquid service.

It will be apparent from my disclosure that circulation rates, otherwise unobtainable, can be achieved with ease through my invention. While the heat input to the reboiler, and likewise the kettle section, is fixed by tower requirements, the percent of butane in the stream circulating through the reboiler affects considerably the amount of heat conveyed from the reboiler to the kettle by a given quantity of said stream. When the butane concentration is high, for a given amount of circulating material more heat will be transferred as heat of vaporization and thus, less total stream can be circulated. By lowering the butane concentration with recycled debutanized alkylate, I enable more of the tower heat requirement to be supplied by sensible heat in the circulating stream and at the same time increase the amount of material which must be circulated to generate the same amount of vapor. More opportunity is thus provided for the organic fluorides present to decompose.

The advantages of this invention are further illustrated by the following example. In this example the reactants and their proportions and other specific conditions are presented as being typical and should not be construed to limit my invention unduly.

Isobutane is alkylated with a mixture of propylene and butylene in the presence of a hydrogen fluoride catalyst under alkylation conditions to produce a hydrocarbon phase, after settling, having a composition shown as deisobutanizer feed in Table I. Isobutane and hydrofluoric acid are removed continuously overhead from the deisobutanizer column while the bottoms are blended with a debutanized alkylate recycle and circulated through the reboiler at a rate of approximately 12 times the net drawoff rate of deisobutanized alkylate to the debutanizer column. The mixture is heated to 425° F. in the reboiler and the organic fluorides are thus decomposed. Flow rates are shown in Table I while operating conditions are set forth in Table II below.

TABLE I

| | Material Flow in Barrels per Stream Day | | | | | | |
|---|---|---|---|---|---|---|---|
| | Fig. 2 Line No. | Hydrogen Fluoride | Propane | Isobutane | Normal Butane | Pentanes and Heavier | Total |
| Deisobutanizer Feed | 19 | 38 | 803 | 9,813 | 2,133 | 2,336 | 15,123 |
| Deisobutanizer Overhead | 23 minus 28 | 38 | 803 | 9,788 | 1,633 | | 12,262 |
| Net Deisobutanized Alkylate | 41 minus 56 | | | 25 | 500 | 2,336 | 2,861 |
| Alkylate Recycle | 56 | | | | 3 | 1,197 | 1,200 |
| Debutanizer Feed | 41 | | | 25 | 503 | 3,533 | 4,061 |
| Debutanizer Overhead | 43 | | | 25 | 495 | 3 | 523 |
| Debutanizer Bottoms | 44 | | | | 8 | 3,530 | 3,538 |
| Alkylate Product | 47 | | | | 5 | 2,333 | 2,338 |

TABLE II

*Operating conditions*

| | Temperature (° F.) | Pressure (p.s.i.a.) | Reflux (b.p.s.d.) |
|---|---|---|---|
| Deisobutanizer: | | | |
| Top | 148 | 160 | 9,407 |
| Bottom | 310 | 165 | |
| Circulating through Reboiler | 425 | 250 | 35,000 |
| Debutanizer: | | | |
| Top | 133 | 85 | 2,340 |
| Bottom | 314 | | |

With the above circulation rate and reboiler temperature the organic fluoride content of the alkylate is reduced from 0.03 weight percent fluorides in the feed to the deisobutanizer column to 0.003 weight percent fluorides in the alkylate product. Without recycle of alkylate to the defluorination furnace in the above example, the fluoride content in the alkylate is substantially the same as in the deisobutanizer feed. The rate of recirculation will vary, depending upon the n-butane present in the deisobutanizer kettle product and the composition of the alkylate recycled. As pointed out above, if heavy alkylate (boiling in the range of about 250 to 550° F.) is recycled, less is required than if light alkylate (boiling in the range of about 80 to 350° F.) or total alkylate is recycled. The best control as to amount of recycle debutanized alkylate is based on refluorination temperature and recirculation rate. These conditions are as outlined above and optimum values for maximum efficiency with acceptable defluorination are best determined by actual operation.

As will be evident to those skilled in the art, various modifications of this invention can be made, or followed, in the light of the foregoing disclosure and discussion, without departing from the spirit or scope thereof.

I claim:

1. In a process wherein isobutane is alkylated with olefin in the presence of hydrogen fluoride and the reaction effluent is separated into an acid phase and a hydrocarbon phase, the improved method of defluorinating said hydrocarbon phase which comprises fractionating said hydrocarbon phase in a fractionation zone to form an overhead stream comprising hydrogen fluoride and isobutane and a bottoms product comprising alkylate, normal butane and organic fluorides; combining said bottoms product with a debutanized alkylate subsequently described; heating said bottoms product and debutanized alkylate to defluorination temperature thereby decomposing said organic fluorides; recirculating the thus heated bottoms and alkylate to said fractionation zone; withdrawing bottoms from said fractionation zone; fractionating said bottoms to form a normal butane overhead stream and an alkylate kettle product; and recirculating a portion of said alkylate product as said above-mentioned debutanized alkylate.

2. The process of claim 1 wherein said alkylate product is fractionated into a light alkylate and a heavy alkylate and a portion of said heavy alkylate is recirculated as said debutanized alkylate.

3. In a process wherein isobutane is alkylated with olefin in the presence of hydrogen fluoride and the reaction effluent is separated into an acid phase and a hydrocarbon phase comprising alkylate, normal butane, isobutane, hydrogen fluoride and organic fluorides, the improved method of recovering an alkylate product substantially free of fluorides which comprises passing said hydrocarbon phase to a first fractionating zone; separating said hydrocarbon phase into an overhead stream comprising isobutane hydrogen fluoride and bottoms comprising alkylate, normal butane and organic fluorides; mixing debutanized alkylate subsequently described with said bottoms to form a mixture; circulating said mixture through a heating zone and back to the lower portion of said first fractionating zone, said mixture being thus heated to about 400 to 500° F. and organic fluorides being thus decomposed; passing a portion of said mixture to a second fractionating zone; separating said portion into an overhead stream comprising normal butane and a bottom stream comprising alkylate, recirculating a portion of said alkylate to said mixing step as said debutanized alkylate; and recovering the remainder of said alkylate as product.

4. The process of claim 3 wherein said mixture is circulated through said heating zone at a rate approximately 6 to 12 times the rate at which the net deisobutanized alkylate in said portion is passed to said second fractionating zone, and heated to about 400 to 450° F.

5. The process of claim 3 wherein the concentration of organic fluorides in said debutanized alkylate does not exceed 0.003 weight percent.

6. In the product recovery system for a hydrogen fluoride alkylation process including a first fractionating column having a kettle portion, an external reboiler for said first column and a second fractionating column, the improvement comprising, in combination, first conduit means for circulating fluid from said kettle section through said reboiler and back to said kettle section, second conduit means connecting said kettle section and an intermediate point in said second fractionating column, third conduit means for withdrawing bottoms product from said second fractionating column, and fourth conduit means for circulating fluid from said conduit means to said first conduit means upstream of said reboiler.

7. In the product recovery system for a hydrogen fluoride alkylation process including a first fractionating column having a kettle portion, an external reboiler for said first column and a second fractionating column, the improvement comprising, in combination, a substantially vertical partition dividing the bottom of said kettle portion into first and second sections, means directing flow from said first column above said kettle section into said first section, first conduit means connecting said first section with said reboiler, second conduit means connecting said reboiler with said second section, third conduit means connecting said second section with said second fractionating column, and fourth conduit means connecting the bottom of said second column with said first conduit means.

8. In the product recovery system for a hydrogen fluoride alkylation process comprising a deisobutanizing column equipped with bubble plates, an external reboiler and a debutanizing column, the improved defluorination apparatus comprising, in combination, a vertical baffle in the bottom of said deisobutanizing column below the bottom bubble plate, said baffle dividing the bottom of the column into first and second sections, said sections communicating over the top of said baffle, the downcomer of said bottom bubble plate extending into said first section, first conduit means connecting said first section with said second section and extending through said external reboiler, second conduit means connecting said second section with an intermediate portion of said debutanizing column, and third conduit means for circulating fluid from the lower portion of said debutanizing column to said first conduit means upstream of said reboiler.

9. The apparatus of claim 7 including flow means in said second conduit means and a liquid level controller positioned to sense liquid level in said first section below the top of said baffle and above the bottom edge of said downcomer, said flow control means being responsive to said liquid level controller.

10. In the product recovery system for a hydrogen fluoride alkylation process comprising a first fractionating column for separating isobutane and hydrogen fluoride from alkylate, said first column having a kettle portion and a vapor-liquid contacting portion, an external reboiler, and a second fractionating column for separating butane from alkylate, the improvement comprising, in combination, a vertical baffle disposed in the lower part of said kettle portion dividing same into first and second sections; means directing the flow from said contacting portion of said first column into said first section; a first conduit having opposite ends thereof connected to said first and second sections and passing through said reboiler; pumping means in said first conduit for circulating material from said first section, through said reboiler and into said second section; means associated with said first conduit for controlling the flow of material through said first conduit in response to temperature in said first conduit downstream of said reboiler; means associated with said reboiler controlling the supply of heat to said reboiler in response to pressure in said first column; a second conduit connecting said second section with an intermediate portion of said second column; means associated with said second conduit controlling the flow of material through said second conduit in response to liquid level in said first section; and third conduit means for circulating fluid from the lower portion of said second column to said first section conduit upstream of said pumping means.

References Cited in the file of this patent

UNITED STATES PATENTS

| 2,377,736 | White | June 6, 1945 |
| 2,459,434 | Kanhofer | Jan. 18, 1949 |
| 2,757,130 | Burns | July 31, 1956 |

UNITED STATES PATENT OFFICE
CERTIFICATION OF CORRECTION

Patent No. 2,972,648                      February 21, 1961

Merritt V. De Lano, Jr.

It is hereby certified that error appears in the above numbered patent requiring correction and that the said Letters Patent should read as corrected below.

Column 8, line 31, after "isobutane" insert -- and --; column 9, line 25, after "flow" insert -- control --; column 10, line 25, strike out "section".

Signed and sealed this 8th day of August 1961.

(SEAL)
Attest:

ERNEST W. SWIDER                         DAVID L. LADD

Attesting Officer                           Commissioner of Patents